United States Patent
Zhang et al.

(10) Patent No.: US 11,425,725 B2
(45) Date of Patent: Aug. 23, 2022

(54) SYSTEMS AND METHODS FOR SOCIAL-AWARE COOPERATIVE DEVICE-TO-DEVICE COMMUNICATIONS

(71) Applicants: Junshan Zhang, Tempe, AZ (US); Xu Chen, Tempe, AZ (US); Zhengyu Zhang, Tempe, AZ (US)

(72) Inventors: Junshan Zhang, Tempe, AZ (US); Xu Chen, Tempe, AZ (US); Zhengyu Zhang, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 0 days.

(21) Appl. No.: 17/087,245

(22) Filed: Nov. 2, 2020

(65) Prior Publication Data
US 2021/0136747 A1  May 6, 2021

Related U.S. Application Data

(63) Continuation of application No. 16/170,937, filed on Oct. 25, 2018, now Pat. No. 10,827,503, which is a (Continued)

(51) Int. Cl.
H04W 72/04 (2009.01)
H04W 4/21 (2018.01)
(Continued)

(52) U.S. Cl.
CPC ........... *H04W 72/048* (2013.01); *H04W 4/21* (2018.02); *H04W 8/005* (2013.01);
(Continued)

(58) Field of Classification Search
CPC ..... H04W 88/04; H04W 76/14; H04W 8/005; H04W 40/22; H04W 48/16; H04W 72/048; H04W 72/0453; H04W 4/21
See application file for complete search history.

(56) References Cited

U.S. PATENT DOCUMENTS 7,779,409 B2    8/2010    Persson et al.
8,015,311 B2    9/2011    Liu
(Continued)

FOREIGN PATENT DOCUMENTS

WO    2013/154546    10/2013

OTHER PUBLICATIONS

Chen, et al., "Social Trust and Social Reciprocity Based Cooperative D2D Communications", Proceedings of the fourteenth ACM international symposium on Mobile ad hoc networking and computing, India, pp. 187-196 (2013).
(Continued)

*Primary Examiner* — Keith Ferguson
(74) *Attorney, Agent, or Firm* — Polsinelli PC

(57) ABSTRACT

A plurality of mobile devices is provided including a first mobile device of the plurality of mobile devices that serves as a relay for communication between a second mobile device of the plurality of mobile devices and a third mobile device of the plurality of mobile devices. The first mobile device is identified as the relay based on a social trust relationship formed between the first mobile device and the second mobile device. A D2D network is formed between the first mobile device and second mobile device. A communication channel is provided to the second mobile device from a second cellular network. A portion of the communication channel is allocated to the second mobile device using the D2D network to improve cellular transmission between the second mobile device and the third mobile device.

6 Claims, 14 Drawing Sheets

Related U.S. Application Data continuation of application No. 14/717,634, filed on May 20, 2015, now Pat. No. 10,159,079.

(60) Provisional application No. 62/001,413, filed on May 21, 2014.

(51) Int. Cl.
| | | |
|---|---|---|
| *H04W 76/14* | (2018.01) | |
| *H04W 8/00* | (2009.01) | |
| *H04W 88/04* | (2009.01) | |
| *H04W 88/06* | (2009.01) | |
| *H04W 40/22* | (2009.01) | |
| *H04W 48/16* | (2009.01) | |

(52) U.S. Cl.
CPC ....... *H04W 72/0453* (2013.01); *H04W 76/14* (2018.02); *H04W 40/22* (2013.01); *H04W 48/16* (2013.01); *H04W 88/04* (2013.01); *H04W 88/06* (2013.01)

(56) References Cited

U.S. PATENT DOCUMENTS

| | | | |
|---|---|---|---|
| 8,060,627 | B2 | 11/2011 | Rosenblatt et al. |
| 10,181,101 | B2 | 1/2019 | Zhang et al. |
| 2006/0200779 | A1 | 9/2006 | Taylor |
| 2007/0254596 | A1* | 11/2007 | Corson ................ H04W 8/005 455/68 |
| 2008/0180401 | A1* | 7/2008 | Khedouri ............ G11B 27/034 345/173 |
| 2008/0268855 | A1* | 10/2008 | Hanuni ............... H04L 41/0896 455/445 |
| 2011/0317569 | A1 | 12/2011 | Kneckt et al. |
| 2013/0005394 | A1* | 1/2013 | Geary ................ H04W 52/028 455/552.1 |
| 2013/0128823 | A1 | 5/2013 | Turtinen |
| 2013/0244722 | A1 | 9/2013 | Rousu |
| 2013/0250843 | A1* | 9/2013 | Zhou .................... H04L 1/1864 370/312 |
| 2013/0273656 | A1 | 10/2013 | Gallagher |
| 2013/0273923 | A1 | 10/2013 | Li et al. |
| 2013/0308490 | A1 | 11/2013 | Lim et al. |
| 2013/0315196 | A1 | 11/2013 | Lim |
| 2014/0295858 | A1 | 10/2014 | Li |
| 2014/0300483 | A1 | 10/2014 | Guo |
| 2014/0307611 | A1 | 10/2014 | Tesanovic |
| 2014/0328166 | A1 | 11/2014 | Park |
| 2015/0056987 | A1 | 2/2015 | Li |
| 2015/0098382 | A1* | 4/2015 | Duval .................. H04W 88/04 370/312 |
| 2015/0156693 | A1 | 6/2015 | Tabet |
| 2019/0089760 | A1 | 3/2019 | Zhang et al. |

OTHER PUBLICATIONS

Zhang, et al., "Exploring Social Ties for Enhanced Device-to-Device Communications in Wireless Networks", IEEE Global Communications Conference, Atlanta, GA, pp. 4597-4602 (2013).

Liu, et al., "Distributed Cooperative Admission and Power Control for Device-to-Device Links with QoS Protection in Cognitive Heterogeneous Network", 7th International ICST Conference on Communications and Networking in China, pp. 712-716 (2012).

Kim, et al., "Demo: Adaptive Video Streaming for Device-to-Device Mobile Platforms", Proceedings of the ACM International Conference on Mobile Computing and Networking (MobiCom'13), Miami, FL, pp. 127-129 (2013).

Osseiran, et al., "Advances in Device-to-Device Communications and Network Coding for IMT-Advanced", ICT Mobile Summit, pp. 1-8 (2009).

Anderegg, et al., "Ad hoc-VCG: A Truthful and Cost-Efficient Routing Protocol for Mobile Ad hoc Networks with Selfish Agents", MobiCom '03 Proceedings of the 9th annual international conference on Mobile computing and networking, San Diego, CA, pp. 245-259 (2003).

Banerjee, et al., "Core in a simple coalition formation game", Social Choice and Welfare, vol. 18, Issue 1, pp. 135-153 (2001).

Boldrini, et al., "ContentPlace: Social-aware Data Dissemination in Opportunistic Networks", ACM Proceedings of the 11th international symposium on Modeling, analysis and simulation of wireless and mobile systems, Vancouver, BC, pp. 203-210 (2008).

Costa, et al., "Socially-Aware Routing for Publish-Subscribe in Delay-Tolerant Mobile Ad Hoc Networks", IEEE Journal on Selected Areas in Communications, vol. 26, Issue 5, pp. 748-760 (2008).

Fodor, et al., "Design Aspects of Network Assisted Device-to-Device Communications", IEEE Communications Magazine, vol. 50, Issue 3, pp. 170-177 (2012).

Gintis, et al., "Strong Reciprocity and Human Sociality", Journal of Theoretical Biology, vol. 206, Issue 2, pp. 169-179 (2000).

Host-Madsen, et al., "Capacity Bounds and Power Allocation for Wireless Relay Channels", IEEE Transactions on Information Theory, vol. 11, Issue 6, pp. 2020-2040 (2005).

Kayastha, et al., "Applications, Architectures, and Protocol Design Issues for Mobile Social Networks: A Survey", Proceedings of the IEEE, vol. 99, Issue 12, pp. 2130-2158 (2011).

Newman, et al., "Random graph models of social networks", Proceedings of the National Academy of Sciences of the United States of America, vol. 99, Issue 1. pp. 2566-2572 (2002).

Yu, et al., "On the performance of Device-to-Device underlay communication with simple power control", IEEE 69th VTC-Spring, pp. 1-5 (2009).

Zhao, et al., "Improving Amplify-and-Forward Relay Networks: Optimal Power Allocation versus Selection", IEEE International Symposium on Information Theory, Seattle, WA, pp. 1234-1238 (2006).

Molva, et al., "CORE: A Collaborative Reputation Mechanism to enforce node cooperation in Mobile Ad hoc Networks", Institute EurecomResearch Report RR-02-062 (2001).

Govier, Social trust and human communities. McGill-Queen's University Press, 1997.

Myerson, Game theory: analysis of conflict. Harvard University Press, 1997.

Global mobile data traffic data forecast update 2011-2016. In Cisco white paper, 2012.

Leskovec, Brightkite dataset. Stanford University. Available at http://snap.stanford.edu/data/loc-brightkite.html, 2012.

\* cited by examiner

SYSTEMS AND METHODS FOR SOCIAL-AWARE COOPERATIVE DEVICE-TO-DEVICE COMMUNICATIONS

CROSS REFERENCE TO RELATED APPLICATIONS

This is a continuation application that claims benefit to U.S. patent application Ser. No. 16/170,937 filed on Oct. 25, 2018, which is a continuation application of U.S. patent application Ser. No. 14/717,634 filed on May 20, 2015 and claims the benefit of U.S. provisional application No. 62/001,413 filed on May 21, 2014, which are herein incorporated by reference in their entirety.

GOVERNMENT SUPPORT

This invention was made with government support under CNS-1117462 and CNS-1218484 awarded by the National Science Foundation and FA9500-09-1-0643 awarded by the Air Force Office of Scientific Research. The government has certain rights in the invention.

FIELD

Aspects of the present disclosure relate to communication networks and design; and more specifically, to mobile and/or wireless communications and communications networks.

BACKGROUND

In the last decade, mobile device communication has increased exponentially. The worldwide shift from basic-feature phones to smartphones combined with a continued growth in tablets, a resurgence in laptops with tablet-like capabilities, as well as expanding machine-to-machine (M2M) applications are key factors driving increases in smart traffic. M2M refers to applications that enable wireless systems to communicate with similar devices to support global positioning satellite (GPS) navigation systems, asset tracking, utility meters, security and surveillance video. M2M connections include wearables such as fitness bands which are being developed with increasingly complex functionality, thereby further contributing to increasing mobile communication trends. As an example of a high-end wearables use case, livestreaming of a GoPro video camera on a cellular network may generate as much as 5 MB of mobile data traffic per minute.

Other general factors include the increase in mobile users, the increase in mobile connections, faster mobile speeds, and more mobile video. As one specific example of mobile growth, according to the annually published index, by 2019 the number of mobile users will increase from 4.3 billion last year to 5.2 billion.

In addition, thanks to the convergence of pervasive mobile communications and fast-growing online social media networking, mobile social networking is penetrating into everyday life. Facebook® posts and Twitter® Tweets can be updated within seconds and Pinterest® can be navigated conveniently and remotely on a wide variety of mobile devices. Pinterest in particular has shown impressive momentum by growing its audience of daily mobile users from 8.0% to 11.4% over the last year. Social media applications, particularly of interest to younger users, consume enormous amounts of data especially when causing the transmission of video content.

As a natural consequence of such explosive growth in mobile communication, mobile data traffic is predicted to grow by over 100 times in the next ten years. Further, video transmission alone is expected to increase by 14× over the next several years with further estimates that in the near future video content will occupy approximately 70% of mobile communication traffic. Such incredible growth poses significant challenges for cellular networks and network providers as the growth must be managed and access must be seamlessly provided to end users who demand greater transmission speeds and availability.

It is with these concepts in mind, among others, that various aspects of the present disclosure were conceived.

SUMMARY OF THE INVENTION

A need exists for improving network communication with mobile devices. Accordingly, in one embodiment, the present invention comprises a device-to-device (D2D) communication system, comprising a plurality of mobile devices, with a first mobile device of the plurality of devices configured to: serve as a relay for communication between a second mobile device of the plurality of mobile devices and a third mobile device of the plurality of mobile devices, wherein the first mobile device is identified as the relay based on a social trust agreement between the first mobile device and the second mobile device. The system further comprises a first D2D network formed between the first mobile device and second mobile device. The system further comprises a first communication channel provided to the first mobile device from a first cellular network. The system further comprises a second communication channel provided to the second mobile device from a second cellular network. At least a portion of the first communication channel is allocated to the second mobile device using the first D2D network to improve cellular transmission between the second mobile device and the third mobile device.

In other embodiments, the present invention comprises a method of providing device-to-device (D2D) communication between a plurality of devices, comprising the steps of providing a first device of the plurality of devices; providing a second device of the plurality of devices in communication with the first device; transmitting a bandwidth assistance request from the first device to the second device; forming a D2D network between the first device and the second device; aggregating bandwidth between the first device and the second device via the D2D network to maximize bandwidth available to the second device; and forming a communication channel between the second device and a third device using the bandwidth aggregated from the first device and second device.

In other embodiments, the present invention comprises a computer program product usable with a programmable computer processor having a computer readable program code embodied in a non-transitory computer usable medium for providing cooperative networking comprising providing a plurality of devices included within a cooperative device-to-device (D2D) communication network, a first device of the plurality of devices configured to serve as a relay for communication between a second device of the plurality of devices and a third device of the plurality of devices.

BRIEF DESCRIPTION OF THE DRAWINGS

Corresponding reference characters indicate corresponding elements among the view of the drawings. The headings used in the figures do not limit the scope of the claims.

DETAILED DESCRIPTION

As described above, the explosive growth of mobile communication generates numerous concerns for communication networks and network providers with respect to network availability and transmission speed.

One promising approach to increase network capacity is to promote direct communications between hand-held devices. Device-to-device (D2D) communications can offer a variety of advantages over traditional cellular communications; such as higher user throughput, improved spectral efficiency, and extended network coverage. For example, a device, operated by a user, can share video content with neighboring devices operated by other users that have similar watching interests which can help to reduce the traffic rate demand from the network operator.

Figure 1:
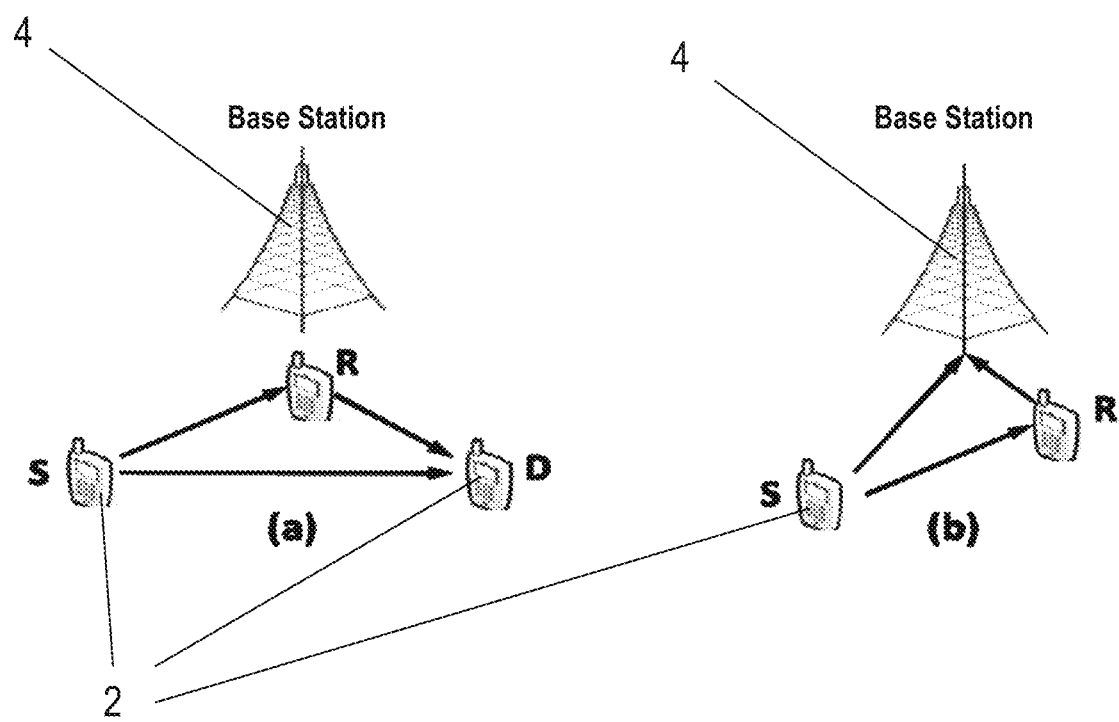
FIG. 1 is an illustration of a device-to-device (D2D) communications network, according to aspects of the present disclosure.

Cooperative communication is an efficient D2D communication paradigm where devices can serve as relays for each other. FIG. 1 shows a high-level illustration of cooperative D2D communication for cooperative networking with a plurality of devices 2 in communication with each other. In some embodiments, devices 2 may include mobile phones, smartphones, wearable devices, fitness devices or other mobile devices, laptop computers, tablets, a television receiver or set-top box (STB), video streaming devices, smart televisions, smartphones, gaming systems, web appliances, communication network nodes (e.g., network routers, switches, or bridges), or computing systems embedded within another device or system (e.g., a household appliance). In subfigure (a), relay device R, of devices 2 serves as the relay for D2D communication between a source device S and another device D. In subfigure (b), relay device R serves as a relay for cellular communication between source device S of devices 2 and a base station 4. Base station 4 connects a number of other devices 2 to one another and/or to a wider area. In some embodiments, base station 4 may include a wireless communications station installed at a fixed location and used to communicate as part of a wireless telephone system such as cellular CDMA or GSM cell site.

In both cases, the D2D communication between devices S and R is part of cooperative networking. As illustrated in FIG. 1, cooperative D2D communication can help to (1) improve the quality of D2D communication for direct data offer-loading between devices 2, and (2) enhance the performance of cellular communications between the base station 4 and the devices 2. Hence, cooperative D2D communication can be a critical building block for efficient cooperative networking for future wireless networks, wherein individual users cooperate to substantially boost the network capacity and cost-effectively provide rich multimedia services and applications, such as video conferencing and interactive media, anytime, anywhere. In some embodiments, the relay provides bandwidth bonding or bandwidth aggregation between the relay and the source mobile device 2 which is discussed in further detail below.

The present disclosure acknowledges that not all devices within a D2D network may be willing to cooperate with each other to improve system performance. Devices are typically owned by different individuals that may pursue a variety of interests. Thus, there is no reason to assume that such users and their respective devices would cooperate with each other. To embrace the pronounced benefits of cooperative D2D communications, there is an additional need to develop a comprehensive and systematic approach to stimulate effective cooperation among device users.

Because hand-held devices are carried by human beings, a natural question is whether it may be at all possible to leverage human social relationship to enhance D2D communications for cooperative networking. Indeed, with the explosive growth of online social networks such as Facebook® and Twitter®, more and more users are actively involved in online social interactions, and social relationships among people are hence extensively broadened and significantly enhanced.

Accordingly, aspects of the present disclosure further include a social-aware cooperation stimulation framework, by leveraging the endogenous incentive which comes from the intrinsic social relationships among users to promote effective and trustworthy cooperation for cooperative D2D communications. More specifically in FIG. 2, the present disclosure includes a system 10 which utilizes social ties in human social networks to enhance cooperative device-to-device communications. Specifically, as hand-held devices are carried by human beings, two key social phenomena, namely social trust and social reciprocity, can be leveraged to promote efficient cooperation among devices. A coalitional game theoretic framework can be included to devise social-tie based cooperation strategies for device-to-device communications. A network assisted relay selection mechanism can be further included by system 10 to implement the coalitional game solution, and show that the mechanism is immune to group deviations, individually rational, and truthful. The performance of the system and mechanism can be described by using real social data traces. Numerical results show that the proposed system can achieve up to 122% performance gain over alternative systems that do not include such D2D social cooperation, according to aspects of the present disclosure.

For the social trust based cooperative D2D communication, data quantifying and/or qualifying various social interactions and/or human relationships (e.g., trusted social ties) may be obtained, gathered, and/or otherwise processed to achieve effective relay assistance during cooperative D2D communication. Data involving kinship, friendship, and colleague relationships may be processed, or otherwise utilized, to achieve effective relay assistance for cooperative D2D communication. One example as to the benefits of using social trust relationships is described as follows. When a device user is at home or place of work, he/she typically has friends in the vicinity. The device the user is engaging may exploit the social trust from neighboring users and/or user devices to improve the quality of D2D communication by asking the most trustworthy device to serve as a relay and boost transmission for the device. The key motivation for using social trust is to utilize the knowledge of human social ties to achieve effective and trustworthy relay assistance among the devices for cooperative D2D communications. Identifying social trust relationships and potential relays for devices 2 can be established offline using mobile applications or web applications to configure social trust relationships before a relay is needed for a device 2. Alternatively, establishing social trust relationships, or connecting a source device S with a relay device R of the devices 2 can occur online, i.e., at the point of transmission. For example, a source device S, may scan a nearby area for available potential relay devices R and view a list of potential relay devices R. Thereafter, source device S may attempt to establish social trust connections with one or more relay devices R by pinging or requesting to connect with the relay devices R for bandwidth assistance.

Figure 5:
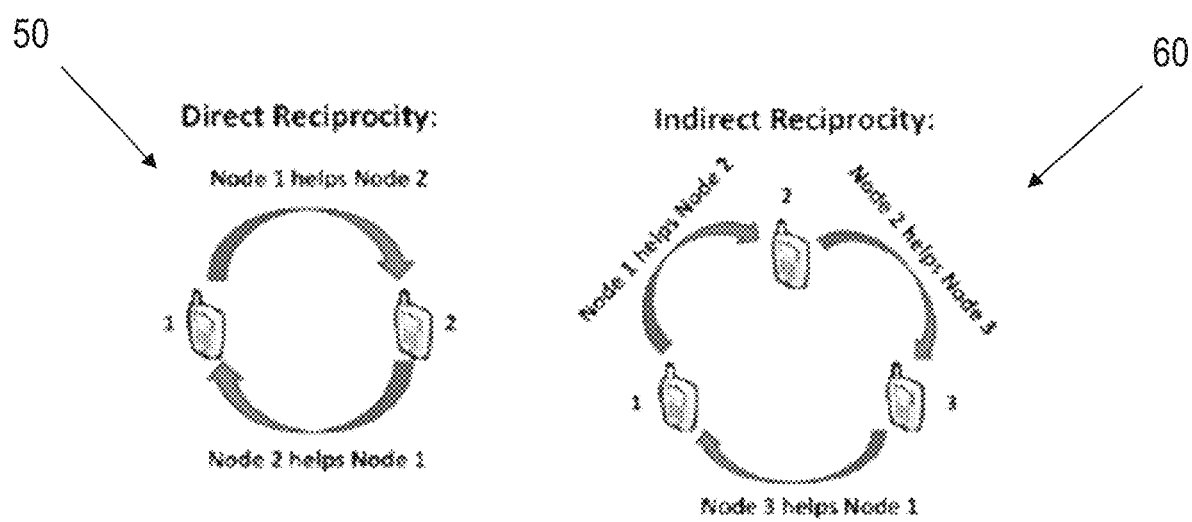
FIG. 5 is an illustration of direct and indirect reciprocity for social reciprocity based relay selection, according to aspects of the present disclosure.

FIG. 5 illustrates the concept of social reciprocity. Social reciprocity is also widely observed in human society. Social reciprocity is a powerful social paradigm to promote cooperation so that a group of individuals without social trust can exchange mutually beneficial actions, making all of them better off. For the social reciprocity based cooperative D2D communication, the principles of direct and indirect reciprocity are leveraged such that users of the devices 2 without social trust can form reciprocal groups to provide mutually beneficial relay assistance to each other. Direct reciprocity is captured in the principle of, "you help me, and I will help you." That is, two individuals exchange altruistic actions so that both obtain a net benefit. Indirect reciprocity is essentially the concept of, "I help you, and someone else will help me." In other words, a group of individuals exchange altruistic actions so that all of them can be better off. A physical-coalitional graph can be used to better describe the possible cooperation relationships among a set of nodes without social trust. Nodes utilizing social reciprocity according to system 10 may be divided into multiple groups to improve data transmission rates by the reciprocal cooperation within the respective groups.

In some embodiments, system 10 determines whether, when provided a set of nodes 20, social reciprocity based relay selection is better than social trust relay selection based on the potential performance levels achievable by either method.

Returning to FIG. 2, system 10, is a cooperative D2D communications network design based on social trust and social reciprocity. System 10 comprises cooperative D2D communications among a plurality of devices 2 based on social trust and social reciprocity. D2D communications may involve both in-band (e.g., using cellular spectrum) and out-band (i.e., using Wi-Fi spectrum) D2D communications to achieve better network connectivity and enhance the communication performance. System 10 can be projected onto two domains: a physical domain 18 and a social domain 16. In the physical domain 18, different devices 2 have different feasible relay selection relationships subject to various physical constraints, e.g., bandwidth constraints and/or signal degradation when the user operating the device is physically located too far from a network or network hub. In the social domain 16, different devices 2, represented as nodes 20, have different assistance relationships based on social trust among the devices 2. With system 10, each device 2 has two options for relay selection: (i) either seek relay assistance from another feasible device 2 that has social trust towards him (her); or (ii) participate in a group formed based on social reciprocity by exchanging mutually beneficial relay assistance. System 10 tackles two key challenges for a social trust and social reciprocity based approach. The first is by determining which option a device 2 should adopt for relay selection: social trust or social reciprocity. The second is determining how to efficiently form groups among devices that adopt the social reciprocity based relay selection.

In the context of describing social trust relationships, the social domain 16 includes a plurality of nodes 20. Nodes 20 may comprise one or more devices 2. Alternatively, each device 2, or a plurality of devices 2 may be configured to represent a single node 20 of social domain 16. In social domain 16 and system 10, a destination node of nodes 20 may also be a transmit node for nodes 20. In some embodiments, the D2D communication lays underneath a cellular infrastructure wherein there exists a base station 4 controlling the up-link/down-link communications of the devices 2. In one embodiment, to avoid generating severe interference to the devices 2, each node 20 may first send a D2D communication establishment request message to the base station 4. The base station 4 then computes the allowable transmission power level for the D2D communication of the node 20 based on the system parameters such as geolocation of the node 20 and the protection requirement of the neighboring devices 2. The proper transmission power of the D2D communication can be computed according to a power control algorithm.

In one embodiment, a time division multiple access (TDMA) mechanism may be utilized by system 10 in which the transmission time is slotted and one node n of a plurality of the nodes 20 can be scheduled to carry out its D2D communication in a time slot. At the allotted time slot, the node n can choose to either transmit to a destination node $d_n$, directly, or to use cooperative communication by asking another node of the nodes 20 in the vicinity of node n to serve as a relay or helper. Alternatively, other multiple access schemes may be utilized.

Figure 2:
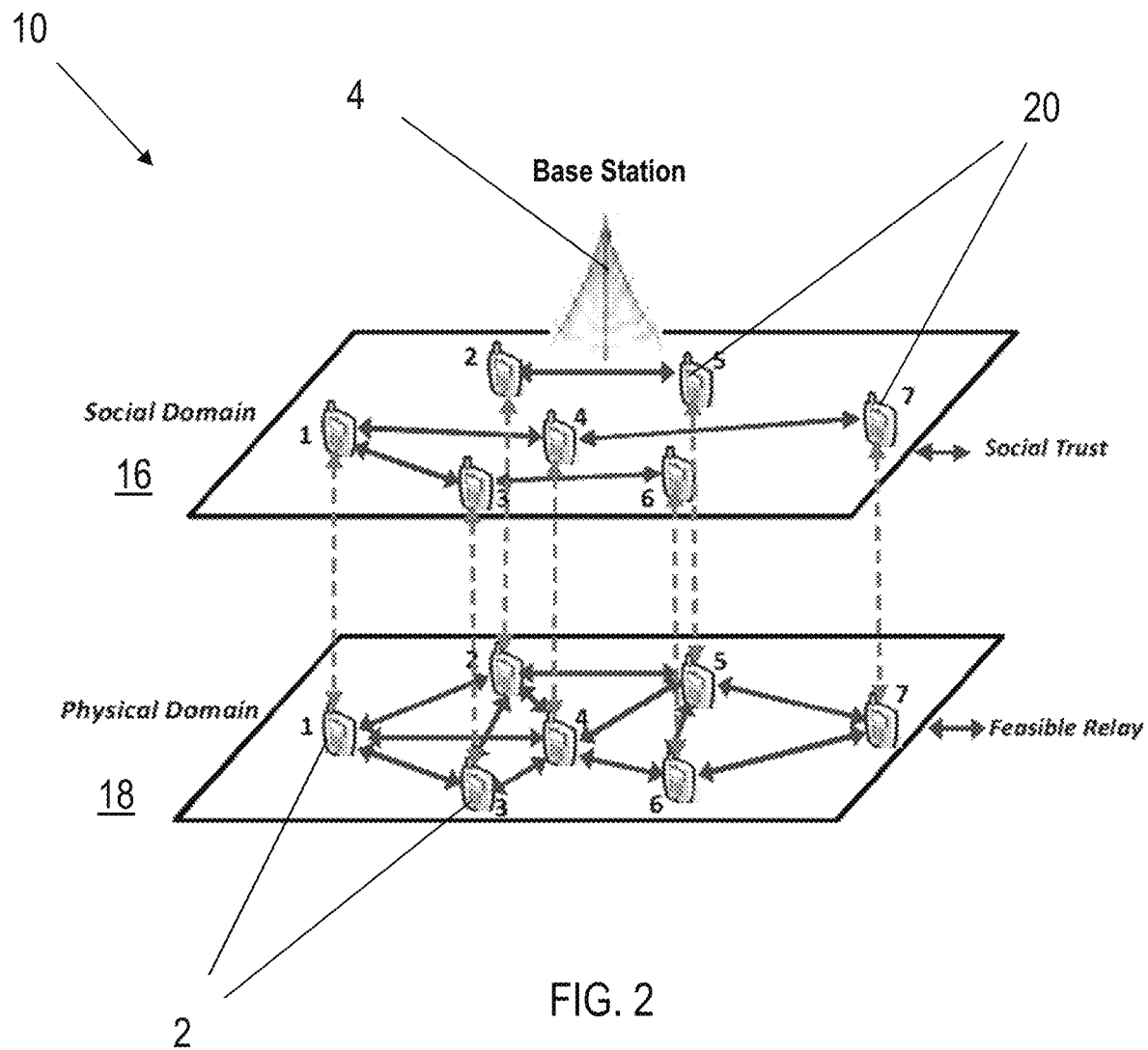
FIG. 2 is an illustration of a D2D communications system utilizing a social trust model for cooperative D2D communications, according to aspects of the present disclosure.
Figure 4:
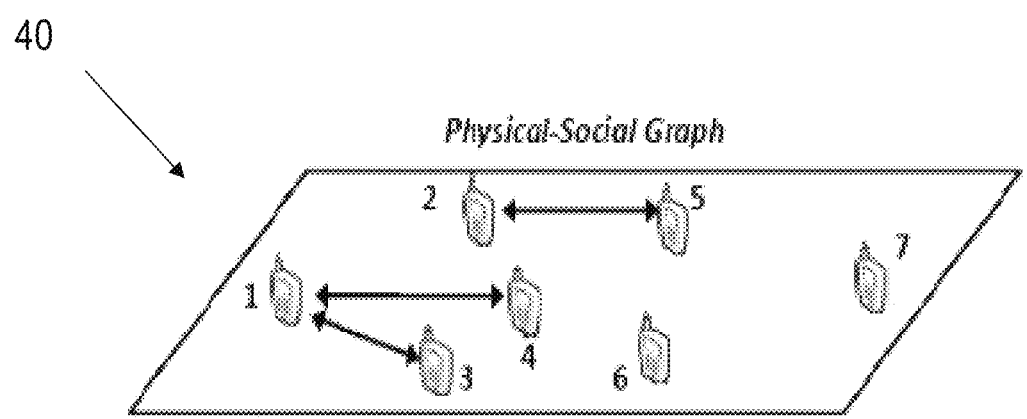
FIG. 4 is an illustration of a physical-social graph based on the physical-social graph in FIG. 2 showing feasible relays which may also have social trust, according to aspects of the present disclosure.

Due to various physical constraints such as signal attenuation, only a subset of nodes 20 that are close enough can be feasible relay candidates for a given node n. To take such physical constraints into account, system 10 utilizes a physical graph, as depicted in FIG. 2 or FIG. 4. In some embodiments, a source node of nodes 20 may choose the best, or optimal relay node among multiple nodes 20 to achieve full diversity. Each of the nodes 20 may select at least one neighboring node as a relay.

A full duplex decode-and-forward (DF) relaying scheme may be utilized by system 10 for D2D communication. As an alternative, the node n can also choose to transmit directly without any relay assistance.

Figure 3:
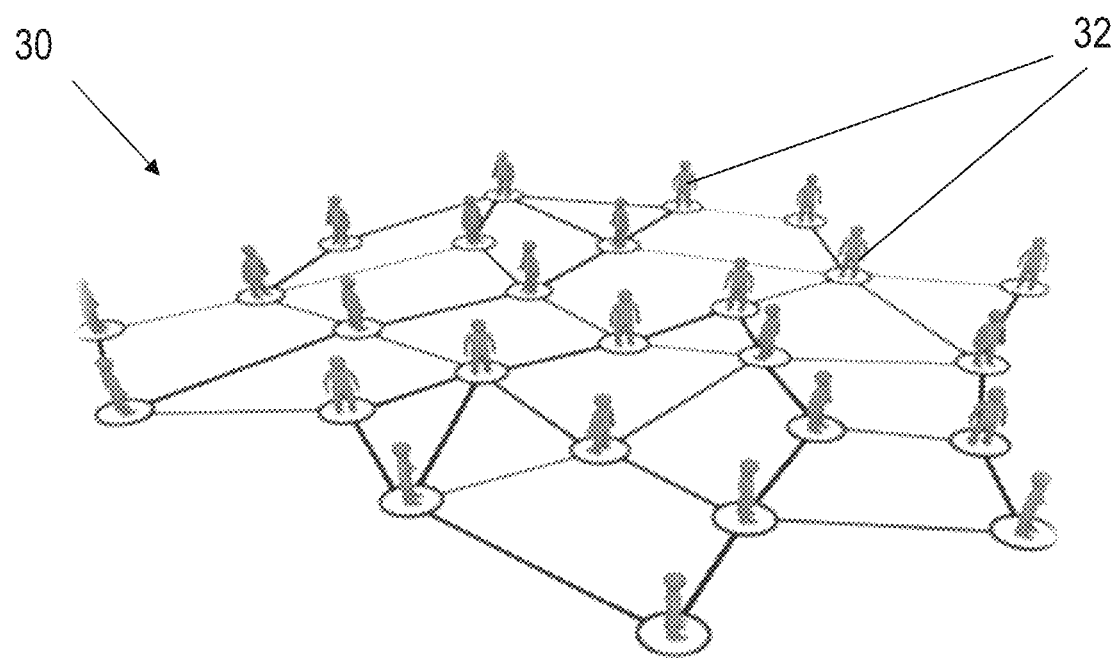
FIG. 3 is an illustration of a social graph mode for use with a D2D system, according to aspects of the present disclosure.

As discussed above, a social trust model can be integrated within cooperative D2D communications. FIG. 3 illustrates further detail regarding the social trust aspect of the present disclosure. As shown, a social graph 30 can be used to model social trust among a plurality of nodes 32 similar to nodes 20 from FIG. 2. The underlying rationale of using social trust is that devices 2 carried by human beings and the knowledge of human social ties can be utilized to achieve effective and trustworthy relay assistance for cooperative D2D communications. If nodes 1 and 3 of nodes 20 of FIG. 4, e.g., have social trust towards one another which can involve kinship, friendship, or colleague relationship between the nodes, then a social trust relationship can be created. In some embodiments, generating a social trust relationship can comprise an offline agreement between the owners of node 1 and 3, using, e.g., a mobile application (app), or software tool to establish a link between nodes 1 and 3. For example, using a mobile app, the owner of node 1 may add node 3 as a trusted social contact. Mobile app can communicate with system 10 to alert system 10 as to the existence of a social trust relationship between nodes 1 and 3. Thereafter, as explained in greater detail below, nodes 1 and 3 may utilize one another as relays to enhance transmission of the respective nodes 1 and 3. Node 1 may assist node 3 with transmission of a large file, and vice versa. Node 1 may assist node 3 with transmission of a phone call when node 3 lacks sufficient cellular or Wi-Fi reception, or vice versa.

System 10 comprises a novel interplay between potential physical network performance gain through efficient D2D cooperation and the exploitation of social relationships among device users to stimulate effective mobile device cooperation. A coalitional game can be used to address relay selection. The coalitional game may admit the top-coalition property based on which a core relay selection algorithm is devised for computing the core solution to the game. A network assisted mechanism may be included within system 10 to implement the coalitional game based solution.

In addition to a D2D communication scenario where devices serve as relays for each other, system 10 can be applied to many other D2D scenarios such as cooperative multiple-input and multiple-output (MIMO) communications and mobile cloud computing. System 10 opens new avenues for mobile social networking and creates great potential to enhance network capacity in future wireless networks, thereby providing a needed solution for the exploding mobile communication industry.

Figure 6:
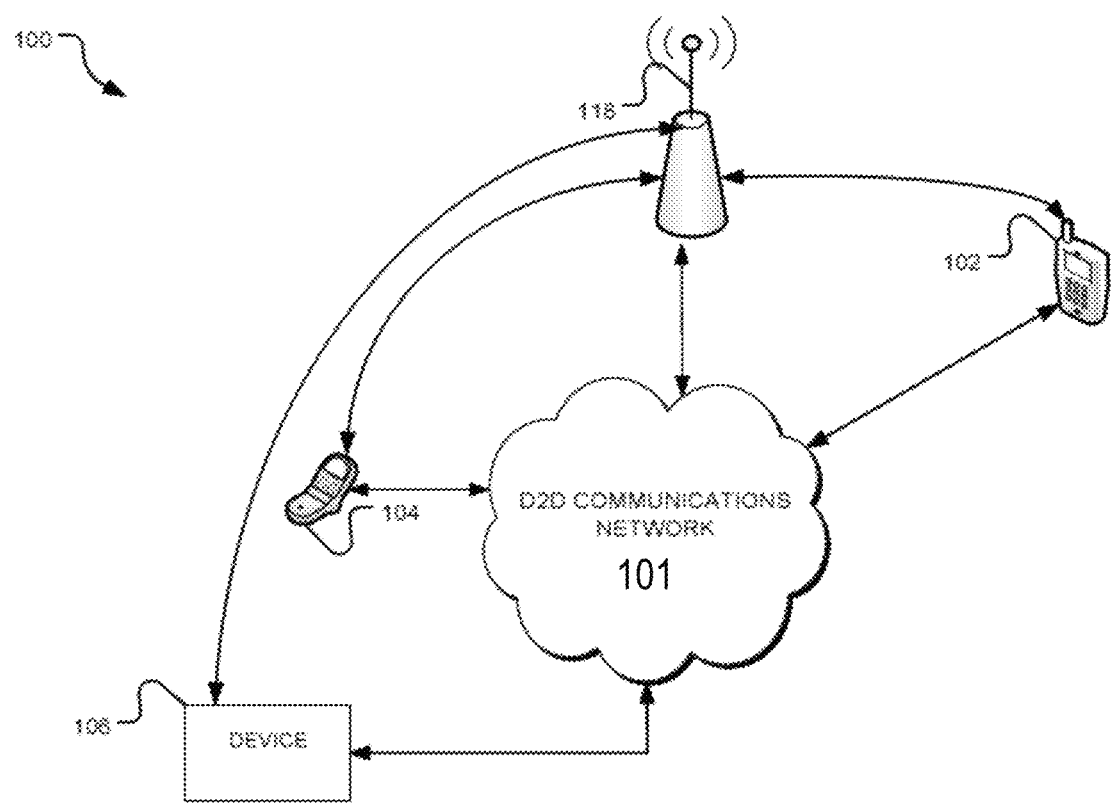
FIG. 6 is an illustration of a D2D communications network utilizing social trust relationships, according to aspects of the present disclosure.

FIG. 6 illustrates an exemplary system 100 which may be a cooperative D2D communications system, similar to system 10, including various hardware and/or software components that may be used for cooperative networking, according to one embodiment. As illustrated, the system 100 includes a D2D network 101 and multiple devices 102, 104, and 106, each of which may be a personal computer, work station, server, mobile device, mobile phone, processor, and/or other type of processing device and may include one or more processors that process software or other machine-readable instructions similar to devices 2. Cooperative D2D communications via D2D network 101 may improve the quality of D2D for direct data offer-loading between the devices 102, 104, and 106, and enhance the performance of communication between a base station 118 and the devices 102, 104, and 106. System 100 may be delivered to devices 102, 104, and 106 and communicate with base station 118 as part of a mobile application or general software application.

In the illustrated embodiment, device 102 serves as a relay for D2D communication between devices 104 and 106. Device 104, a source device, may desire to download a file from or otherwise communicate with device 106. However, bandwidth available to device 104 may be weak or inadequate. Device 104 may be in a location where, because of the specific physical location of device 104, bandwidth to base station 118 is weak or device 104 is already consuming too much bandwidth through operation of other applications and lacks sufficient transmission capability to adequately communicate with device 106. Because device 104 is constrained with respect to bandwidth, device 104 may, utilizing system 100, request bandwidth assistance from device 102. Device 104 can split its data traffic into two flows; one data stream may be created and utilized by device 104 from base station 118 as normal, and a second data stream may be provided from device 102 as device 102 acquires a portion of the data requested by device 104 from base station 118 and/or device 106. Information exchange between device 104 and 102 through network 101 can occur via unlicensed out-band band transmission, such as Wi-Fi or Wi-Fi direct, or via licensed in-band transmission via, e.g., a cellular network. As such, device 102, acting as the relay, also requests information to and from device 106 and shares the information with device 104 via network 101 to assist device 104 with its bandwidth needs, e.g., data transmission to and from device 106.

Accordingly, system 100 can provide a pre-approved communication link between mobile devices to enhance data transmission when relay devices, such as device 102, are idle and have capability to help other devices, such as device 104. As described above, the users of device 102 and device 104 may have a social trust relationship. In either case, in some embodiments, device 102 has at least provided some approval to be used as a relay device by device 104. While FIG. 6 illustrates one relay device, device 102, the present disclosure is not limited to one relay device and in some embodiments device 104 may be provided with additional bandwidth from a variety of relay devices.

Figure 7:
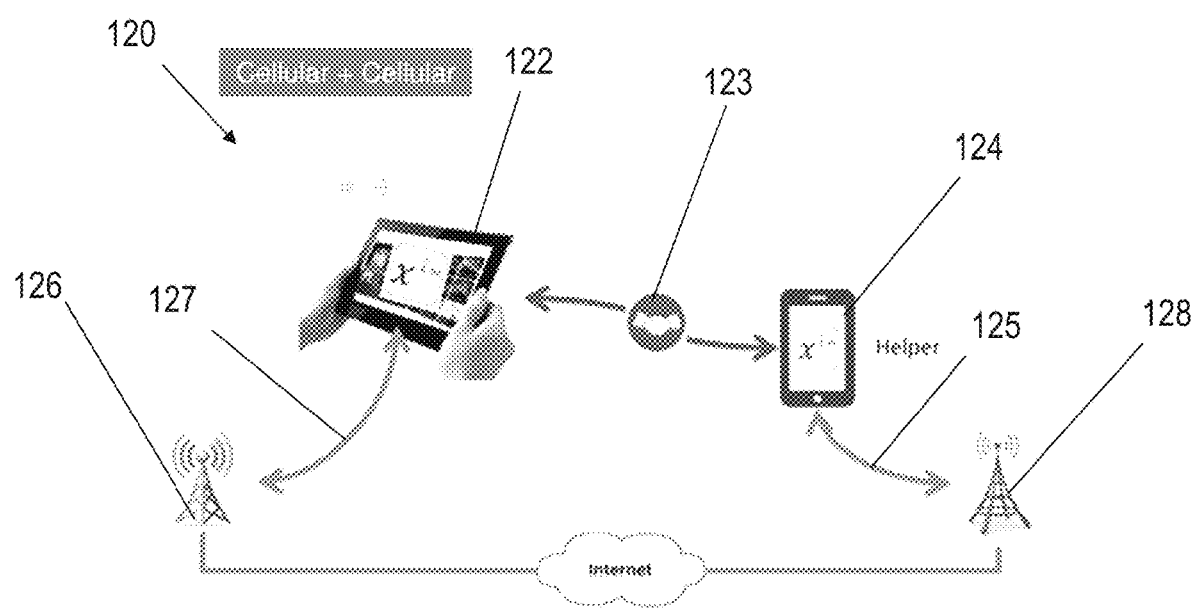
FIG. 7 is an illustration of a usage scenario for a D2D communications system utilizing a social trust model for cooperative D2D communications with exemplary mobile devices receiving data transmission via a cellular network, according to aspects of the present disclosure.

FIG. 7 illustrates an example scenario 120 implementing system 10 (FIG. 2) or system 100 (FIG. 6) where a source device and a relay device (e.g., helper device) both have access to bandwidth via one or more cellular networks. A device 122, similar to devices 2, acting as a source device, is in communication with a device 124 similar to devices 2, via a network 123 with device 124 acting as a relay or helper device. Network 123 may be a D2D network based on system 10 or system 100 which utilizes social ties in human social networks to enhance D2D communications or cooperative networking. In other words, device 122 and device 124 have some social incentive to work together as described above. Network 123 may comprise an in-band or licensed network, such as a cellular network. Alternatively, network 123 may be an out-band or unlicensed network which may utilize Wi-Fi direct, or Bluetooth connectivity. In some embodiments, additional devices 2 may be included as additional relays such that device 122 receives additional bandwidth from more than one helper or relay.

As shown, device 122 accesses a communication channel 127 from a cellular network 126. Communication channel 127 may be a bit pipe or bandwidth and can define a bandwidth value available to device 122 from cellular network 126. Device 124 also accesses a communication channel 125, similar to communication channel 127, from a cellular network 128 such that communication channel 125 defines a bandwidth value available to device 124. Accordingly, device 124 has bandwidth available for sharing with device 122 depending on the strength or value of communication channel 125. Cellular networks 128 and 126 may be the same cellular network. Alternatively, cellular networks 126 and 128 may comprise different cellular networks. Cellular networks 126 and 128 may also be referred to as bandwidth sources.

Device 122 has requested, and is receiving bandwidth assistance from device 124 which is being provided via network 123. By bonding or aggregating a portion of communication channel 125 with communication channel 127, via network 123, and extending the aggregated bandwidth to device 122, device 122 can benefit and accumulate enough bandwidth to meet its needs, e.g., download a large video file or improve inbound/outbound transmission quality for device 122 in areas where communication channel 127 is poor, i.e., the communication channel has limited bandwidth. In some embodiments, device 124 has pre-authorized device 122 to consume a portion of communication channel 125 because of a social trust or social reciprocity relationship.

Figure 8:
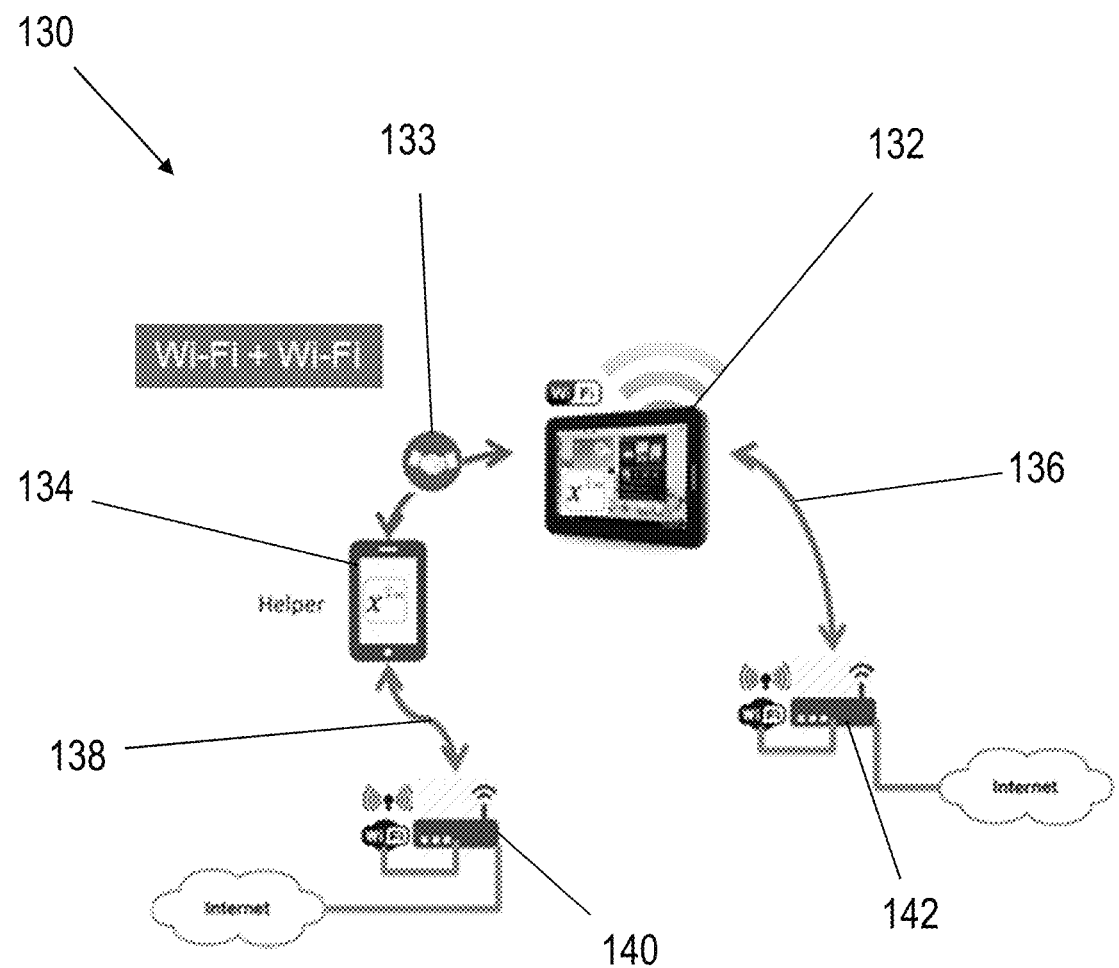
FIG. 8 is an illustration of a usage scenario for a D2D communications system utilizing a social trust model for cooperative D2D communications with exemplary mobile devices receiving data transmission from a Wi-Fi source, according to aspects of the present disclosure.

FIG. 8 illustrates another example scenario 130 implementing system 10 (FIG. 2) or system 100 (FIG. 6) where a source device and a relay device (e.g., helper device) both have access to bandwidth via one or more Wi-Fi networks provided via a plurality of access points. A device 132, similar to devices 2, acting as a source device, is in communication with a device 134, similar to devices 2, via a network 133 with device 134 acting as a relay device. Network 133 may be a D2D network based on system 10 or system 100 which utilizes social ties in human social networks to enhance D2D communications or cooperative networking. In other words, device 132 and device 134 have some social incentive to work together as described above. Network 133 may comprise an in-band or licensed network, such as a cellular network. Alternatively, network 133 may be an out-band or unlicensed network which may utilize Wi-Fi direct, or Bluetooth connectivity. In some embodiments, additional devices 2 may be included such that device 132 receives additional bandwidth from more than one helper or relay devices.

In FIG. 8, Device 132 accesses a communication channel 136 from a Wi-Fi access point 142. Communication channel 136 may be a bit pipe or bandwidth and can define a bandwidth value available to device 132 from a Wi-Fi network. Device 134 also accesses a communication channel 138, similar to communication channel 136, from a Wi-Fi access point 140 such that communication channel 138 defines a bandwidth value available to device 134 from a Wi-Fi network. Accordingly, device 134 has bandwidth available for sharing with device 132 depending on the strength or value of communication channel 138. In some embodiments, Wi-Fi access points 140 and 142 may be linked to the same Wi-Fi network. Wi-Fi access points 140 and 142 may also be referred to as bandwidth sources.

Device 132 has requested, and is receiving bandwidth assistance from device 134 which is being provided via network 133. By bonding or aggregating a portion of communication channel 138 with communication channel 136, via network 133, and extending the aggregated bandwidth to device 132, device 132 can benefit and accumulate enough bandwidth to meet its needs, e.g., download a large video file or improve inbound/outbound transmission quality for device 132 in areas where communication channel 136 is poor. In some embodiments, device 134 has pre-authorized device 132 to consume a portion of communication channel 138 because of a social trust or social reciprocity relationship.

Figure 9:
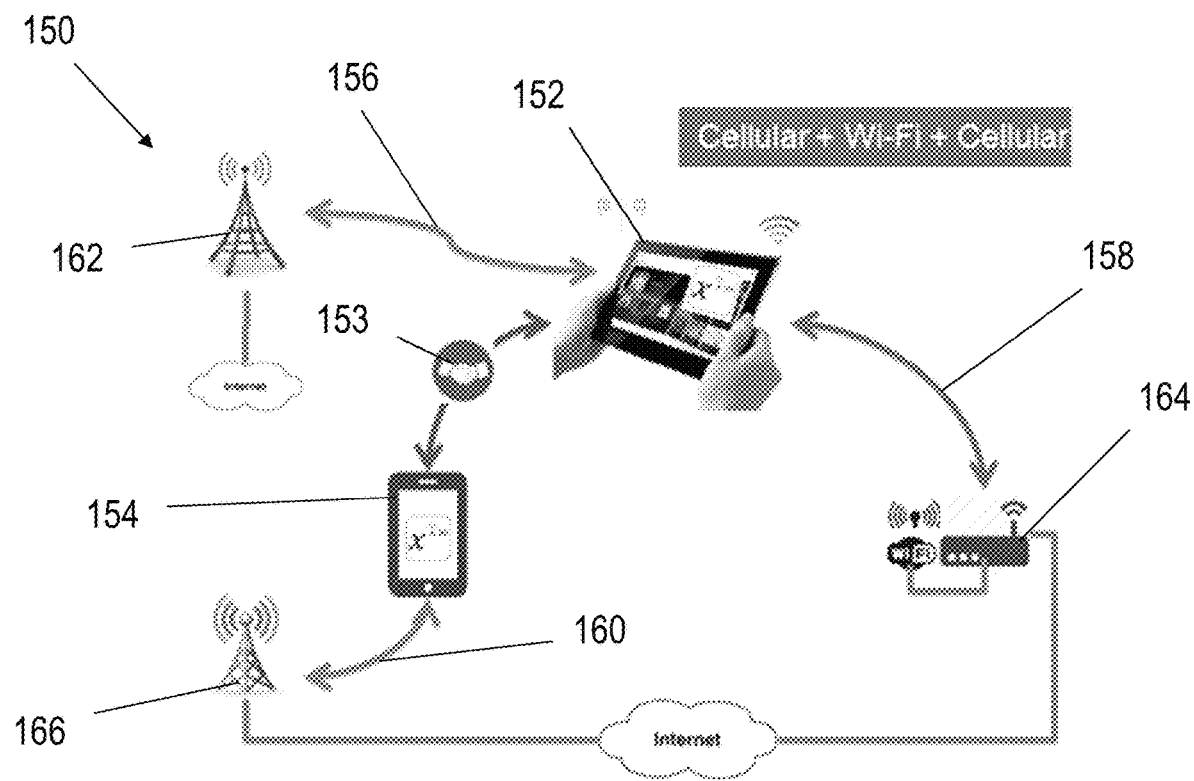
FIG. 9 is an illustration of a usage scenario for a D2D communications system utilizing a social trust model for cooperative D2D communications with one or more mobile devices receiving data transmission via a cellular network and one or more mobile devices receiving data transmission via a Wi-Fi source, according to aspects of the present disclosure.

FIG. 9 illustrates another example scenario 150 implementing system 10 (FIG. 2) or system 100 (FIG. 6) where a source device and a relay device (e.g., helper device) may have access to one or more transmission sources (Wi-Fi or cellular networks). In scenario 150, device 152 is aggregating bandwidth from a plurality of separate transmission sources. Device 152 is aggregating bandwidth from a cellular communication channel 156 provided by cellular network 162 and a Wi-Fi communication channel 158 provided by Wi-Fi access point 164. As such, scenario 150 depicts a case where device 152 maximizes bandwidth by bonding bandwidth available from both Wi-Fi networks and cellular networks.

In addition, device 152 may still be provided bandwidth assistance by one or more helper or relay devices such as device 154. Device 154 provides additional bandwidth bonding to device 152 via network 153. Network 153 may be a D2D network based on system 10 or system 100 which utilizes social ties in human social networks to enhance D2D communications or cooperative networking. Network 153 may comprise an in-band or licensed network, such as a cellular network. Alternatively, network 153 may be an out-band or unlicensed network which may utilize Wi-Fi direct, or Bluetooth connectivity.

By bonding or aggregating a portion of communication channel 160 with communication channels 156 and 158, via network 153, and extending the aggregated bandwidth to device 152, device 152 can receive maximum bandwidth assistance from a variety of sources, i.e., communication channels 156, 158, and 160. In some embodiments, communication channels 156, 158, and 160 may include bit pipes or bandwidths which define a predetermined bandwidth value.

Figure 10:
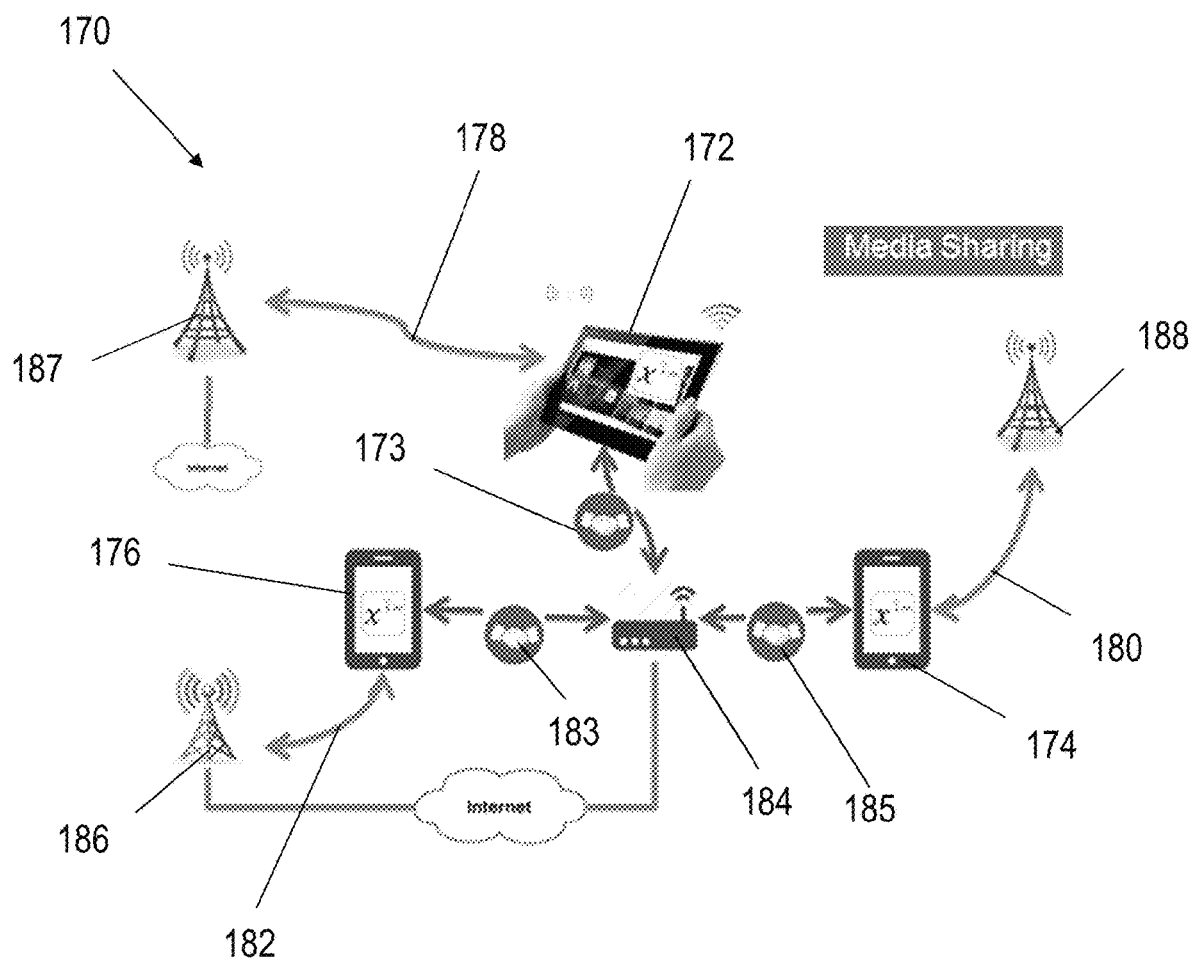
FIG. 10 is an illustration of a usage scenario for a D2D communications system utilizing a social trust model for cooperative D2D communications directed to media sharing, according to aspects of the present disclosure.

FIG. 10 illustrates a scenario 170 directed to media sharing where a plurality of relay or helper devices can share media with a network to optimize media transmission or downloading of media files to a source device. More specifically, device 172 can benefit from media sharing as device 176 and device 174 allocate a portion of bandwidth and/or sharing of media files to device 172, via a network 173 which may comprise a D2D network. Network 173 may comprise an in-band or licensed network, such as a cellular network. Alternatively, network 173 may be an out-band or unlicensed network which may utilize Wi-Fi direct, or Bluetooth connectivity.

Device 174 may transmit one or more media files to an access point 184 via a D2D network 185. Network 185 may comprise an in-band or licensed network, such as a cellular network. Alternatively, network 185 may be an out-band or unlicensed network which may utilize Wi-Fi direct, or Bluetooth connectivity.

Similarly, device 176 may transmit one or more media files to access point 184 via D2D network 183. Network 183 may comprise an in-band or licensed network, such as a cellular network. Alternatively, network 183 may be an out-band or unlicensed network which may utilize Wi-Fi direct, or Bluetooth connectivity.

With multiple D2D networks 183, 185, and 173 extending some bandwidth to device 172 or sharing media files with device 172, device 172 can access the media files bundled or arriving at access point 184 using network 173 which reduces the time normally required for device 172 to download the total amount of media files needed to, e.g., view a Hi-definition video.

As further shown, device 176 receives bandwidth from a source 186 via communication channel 182. Similarly, device 174 receives bandwidth from a source 188 via communication channel 180. Finally, device 172 receives bandwidth from source 187 via communication channel 178. While source 186, source 187, and source 188 are depicted as cellular networks, sources 186-188 may also be Wi-Fi networks. Media files transmitted to devices 176 and 174 via, respectively, communication channels 182 and 180 can be shared with device 172 via network 173. Network 173 may be a D2D network based on system 10 which utilizes social ties in human social networks to enhance D2D communications or cooperative networking. In the case of scenario 170, device 176 and device 174 have authorized device 172 to utilize bandwidth and share media files available from device 174 and 176.

Figure 11:
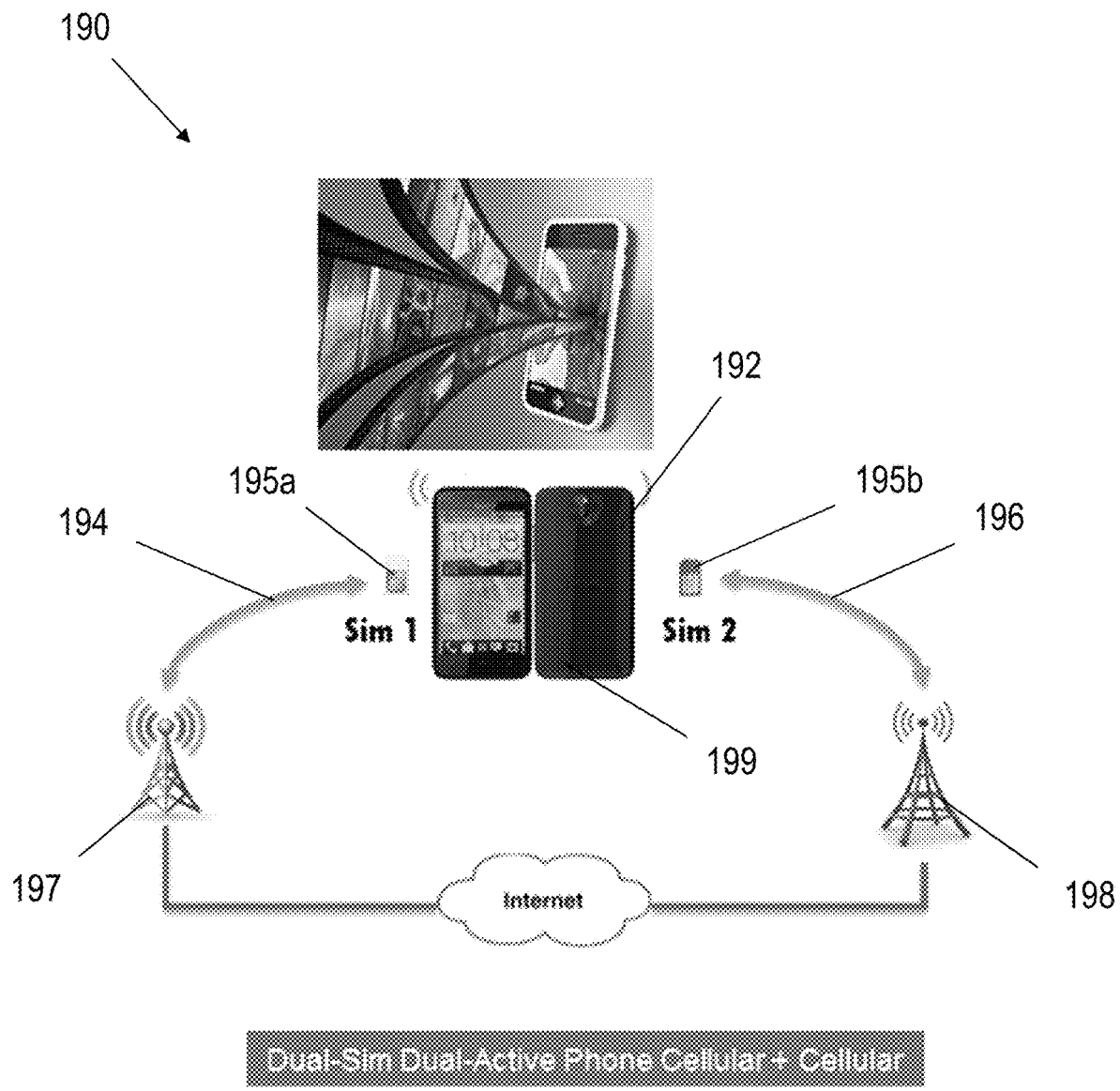
FIG. 11 is an illustration of a usage scenario for a D2D communications system utilizing a social trust model for cooperative D2D communications with double bandwidth for mux and demux in dual subscriber identity module (SIM) card and dual active phones, according to aspects of the present disclosure.

FIG. 11 illustrates a scenario 190 involving bandwidth aggregation using a single device 192. Bandwidth from two SIM cards coupled to a single device, with each of the SIM cards connected to respective cellular networks, can be bonded and utilized simultaneously to serve bandwidth-demanding applications such as mobile video. Because each SIM card is associated with and electronically coupled to a cellular transceiver, a device such as device 192 can split a data stream into two new data streams, making full use of the bandwidth of the two cellular networks. Specifically, a schedule component splits a requested resource into smaller segments and intelligently decides which cellular network should be used to download or transmit each segment. In some embodiments, no cooperation is required from the operator end, e.g., the cellular network administrator. The bandwidth bonding in this context can be accomplished at the user end. A user may activate bandwidth bonding for dual SIM card phones functionality when executing bandwidth-demanding applications. In addition, the functionality can be disabled when not needed by the user. The present embodiment is a novel advancement from conventional dual SIM card phones. Conventional dual SIM card phones utilize one cellular network at a time while keeping the other cellular network idle.

According to the specific example in FIG. 11, device 192 comprises a dual SIM phone with capability to hold and manage two separate SIM cards. A phone with two SIM cards can hold two numbers and two identities at once. The user can make or receive calls and send or receive texts on either number. Device 192 is a dual active phone, i.e., device 192 includes two transceivers such that device 192 is capable of receiving calls on both SIM cards. Alternatively device 192 may comprise a passive or standby dual SIM phone. Device 192 may further include a SIM manager 199 for managing SIM cards 195a and 195b.

Dual SIM phones are especially popular in rural areas where network availability varies and users can use two different networks without the need to have two or more devices. However, with conventional dual SIM card phones, the bandwidth or bit pipes corresponding to their respective cellular networks remain isolated. In other words, each SIM card and its respective connection to a cellular network does not utilize or communicate with the other SIM card and its respective cellular network.

As further shown, SIM 1 card 195a is receiving bandwidth from a cellular network 197 via a communication channel 194. Similarly, SIM 2 card 195b is receiving bandwidth from a cellular network 198 via a communication channel 196. In scenario 190, device 192 aggregates a portion of communication channel 196 to communication channel 194 to increase the total bandwidth value of communication channel 194. Device 192 may alternatively aggregate a portion of communication channel 194 to communication channel 196. As such, in scenario 190, device 192 can combine bandwidth from different cellular networks such as cellular network 198 and cellular network 197. In some embodiments, SIM manager 199, which may comprise software applications and hardware of device 192, can assist with the bandwidth combination.

Device 192 optimizes available bandwidth by aggregating bandwidth available to SIM 1 card 195a or SIM 2 card 195b. Therefore, for example, when device 192 is located in an area where either of communication channel 194 and communication channel 196 are weak, aggregating communication channel 194 with communication channel 196 can generate a single stronger bandwidth for improved transmission to and from device 192. The illustrated concept of bandwidth bonding across two SIM cards carries over to a single device with multiple SIM cards. In other words, device 192 may be configured to have two SIM cards as shown or may be configured to have three or more SIM cards. In alternate embodiments, bandwidth bonding between multiple SIM cards can be achieved by bonding SIM cards located on separate devices.

Figure 12:
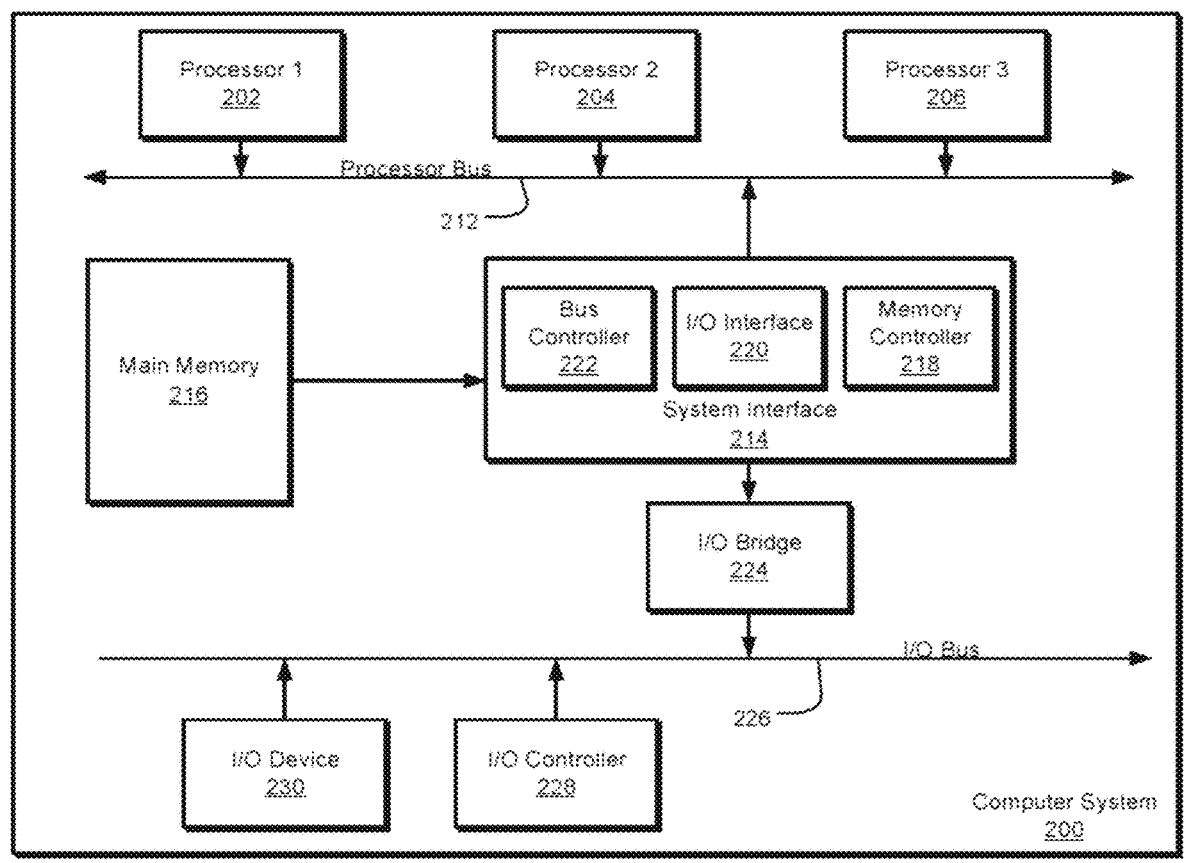
FIG. 12 is a simplified block diagram showing a computing device which may be used by a D2D communications system, according to aspects of the present disclosure.

FIG. 12 is a simplified block diagram illustrating an example of a computing device or computer system 200 which may be used in implementing the embodiments of the components of the system 10 disclosed above. For example, the computing system 200 of FIG. 12 may be used to implement any of the various components of the D2D communication network and/or the devices discussed above. The computer system (system) includes one or more processors 202-206. Processors 202-206 may include one or more internal levels of cache (not shown) and a bus controller or bus interface unit to direct interaction with the processor bus 212. Processor bus 212, also known as the host bus or the front side bus, may be used to couple the processors 202-206 with the system interface 214. System interface 214 may be connected to the processor bus 212 to interface other components of the system 200 with the processor bus 212. For example, system interface 214 may include a memory controller 214 for interfacing a main memory 216 with the processor bus 212. The main memory 216 typically includes one or more memory cards and a control circuit (not shown). System interface 214 may also include an input/output (I/O) interface 220 to interface one or more I/O bridges or I/O devices with the processor bus 212. One or more I/O controllers and/or I/O devices may be connected with the I/O bus 226, such as I/O controller 228 and I/O device 240, as illustrated.

I/O device 240 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

System 200 may include a dynamic storage device, referred to as main memory 216, or a random access memory (RAM) or other computer-readable devices coupled to the processor bus 212 for storing information and instructions to be executed by the processors 202-206. Main memory 216 also may be used for storing temporary variables or other intermediate information during execution of instructions by the processors 202-206. System 200 may include a read only memory (ROM) and/or other static storage device coupled to the processor bus 212 for storing static information and instructions for the processors 202-206. The system set forth in FIG. 12 is but one possible example of a computer system that may employ or be configured in accordance with aspects of the present disclosure.

According to one embodiment, the above techniques may be performed by computer system 200 in response to processor 204 executing one or more sequences of one or more instructions contained in main memory 216. These instructions may be read into main memory 216 from another machine-readable medium, such as a storage device. Execution of the sequences of instructions contained in main memory 216 may cause processors 202-206 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 216. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The embodiments of the present disclosure described herein can be implemented as logical steps in one or more computer systems. The logical operations of the present disclosure can be implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

Figure 13:
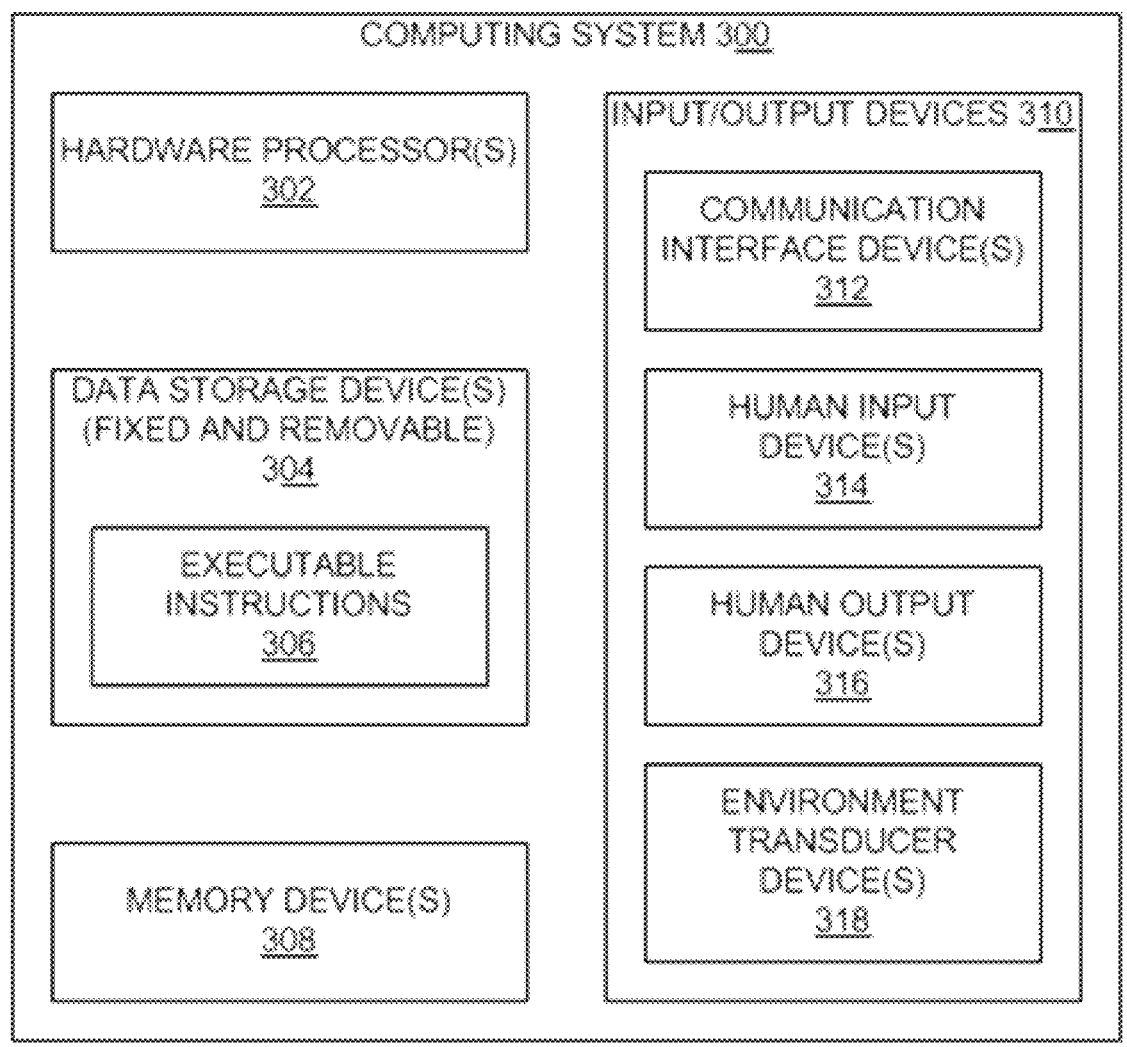
FIG. 13 is a simplified block diagram showing another computing device which may be used by a D2D communications system, according to aspects of the present disclosure.

FIG. 13 illustrates another embodiment of a computing system 300 that may be useful in implementing the described D2D system. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A software application coded to implement system 10 or system 100 may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

FIG. 13 is a simplified block diagram of a machine in the example form of a computer system 300 within which instructions 306 for causing the machine to perform any one or more of the methodologies discussed herein may be executed by one or more hardware processors 302. In various embodiments, computing system 300 is connected (e.g., networked) to a plurality of other computing devices or machines. Alternatively, the machine operates as a standalone device and defines at least one node. In a networked deployment, computer system 300 may operate as a peer machine in a peer-to-peer (or distributed) network environment or related environment. In some examples, the machine may be a desktop computer, a laptop computer, a tablet computer, a television receiver or set-top box (STB), a video streaming device, a smart television, a smartphone, a gaming system, a web appliance, a communication network node (e.g., a network router, switch, or bridge), a computing system embedded within another device or system (e.g., a household appliance), or any machine capable of executing instructions 306 (sequential or otherwise) that specify actions to be taken by that machine. Further, while only a single computer system 300 is illustrated, the term "machine" and computer system 300 shall also be taken to include any collection of machines or computer systems 300 that individually or jointly execute a set (or multiple sets) of instructions 306 to perform any one or more of the methodologies discussed herein such as bandwidth aggregation using social trust relationships.

As further depicted in FIG. 13, the example computing system 300 may include one or more hardware processors 302, one or more data storage devices 304, one or more memory devices 308, and/or one or more input/output devices 310. Each of these components may include one or more integrated circuits (ICs) (including, but not limited to, FPGAs, ASICs, and so on), as well as more discrete components, such as transistors, resistors, capacitors, inductors, transformers, and the like. Various ones of these components may communicate with one another by way of one or more communication buses, point-to-point communication paths, or other communication means not explicitly depicted in FIG. 13. Additionally, other devices or components, such as, for example, various peripheral controllers (e.g., an input/output controller, a memory controller, a data storage device controller, a graphics processing unit (GPU), and so on), a power supply, one or more ventilation fans, and an enclosure for encompassing the various components, may be included in the example computing system 300, but are not explicitly depicted in FIG. 13 or discussed further herein.

The at least one hardware processor 302 may include, for example, a central processing unit (CPU), a microprocessor, a microcontroller, and/or a digital signal processor (DSP). Further, one or more hardware processors 302 may include one or more execution cores capable of executing instructions and performing operations in parallel with each other.

The one or more data storage devices 304 may include any non-volatile data storage device capable of storing the executable instructions 306 and/or other data generated or employed within the example computing system 300. In some examples, the one or more data storage devices 304 may also include an operating system (OS) that manages the various components of the example computing system 300 and through which application programs or other software may be executed. Thus, in some embodiments, the executable instructions 306 may include instructions of both application programs and the operating system. Examples of the data storage devices 304 may include, but are not limited to, magnetic disk drives, optical disk drives, solid state drives (SSDs), flash drives, and so on, and may include either or both removable data storage media (e.g., Compact Disc Read-Only Memory (CD-ROM), Digital Versatile Disc Read-Only Memory (DVD-ROM), magneto-optical disks, flash drives, and so on) and non-removable data storage media (e.g., internal magnetic hard disks, SSDs, and so on).

The one or more memory devices 308 may include, in some examples, both volatile memory (such as, for example, dynamic random access memory (DRAM), static random access memory (SRAM), and so on), and non-volatile memory (e.g., read-only memory (ROM), flash memory, and the like). In one embodiment, a ROM may be utilized to store a basic input/output system (BIOS) to facilitate communication between an operating system and the various components of the example computing system 300. In some examples, DRAM and/or other rewritable memory devices may be employed to store portions of the executable instructions 306, as well as data accessed via the executable instructions 306, at least on a temporary basis. In some examples, one or more of the memory devices 308 may be located within the same integrated circuits as the one or more hardware processors 302 to facilitate more rapid access to the executable instructions 306 and/or data stored therein.

The one or more data storage devices 304 and/or the one or more memory devices 308 may be referred to as one or more machine-readable media, which may include a single medium or multiple media (e.g., a centralized or distributed database, and/or associated caches and servers) that store the one or more executable instructions 306 or data structures. The term "machine-readable medium" shall also be taken to include any tangible medium that is capable of storing, encoding, or carrying instructions 306 for execution by the machine and that cause the machine to perform any one or more of the methodologies of the present invention, or that is capable of storing, encoding, or carrying data structures utilized by or associated with such instructions 306.

The input/output devices 310 may include one or more communication interface devices 312, human input devices 314, human output devices 316, and environment transducer devices 318. The one or more communication interface devices 312 may be configured to transmit and/or receive information between the example computing system 300 and other machines or devices by way of one or more wired or wireless communication networks or connections. The information may include data that is provided as input to, or generated as output from, the example computing device 300, and/or may include at least a portion of the executable instructions 306. Examples of such network or connections may include, but are not limited to, Universal Serial Bus (USB), Ethernet, Wi-Fi®, Bluetooth®, Near Field Communication (NFC), Long-Term Evolution (LTE), and so on. One or more such communication interface devices X10 may be utilized to communicate one or more other machines, either directly over a point-to-point communication path, over a wide area network (VVAN) (e.g., the Internet), over a local area network (VVAN), over a cellular (e.g., third generation (3G) or fourth generation (4G)) network, or over another communication means. Further, one or more of one of wireless communication interface devices 312, as well as one or more environment transducer devices 318 described below, may employ an antenna for electromagnetic signal transmission and/or reception. In some examples, an antenna may be employed to receive Global Positioning System (GPS) data to facilitate determination of a location of the machine or another device.

In some embodiments, the one or more human input devices 314 may convert a human-generated signal, such as, for example, human voice, physical movement, physical touch or pressure, and the like, into electrical signals as input data for the example computing system 300. The human input devices 314 may include, for example, a keyboard, a mouse, a joystick, a camera, a microphone, a touch-sensitive display screen ("touchscreen"), a positional sensor, an orientation sensor, a gravitational sensor, an inertial sensor, an accelerometer, and/or the like.

The human output devices 316 may convert electrical signals into signals that may be sensed as output by a human, such as sound, light, and/or touch. The human output devices 316 may include, for example, a display monitor or touchscreen, a speaker, a tactile and/or haptic output device, and/or so on.

The one or more environment transducer devices 318 may include a device that converts one form of energy or signal into another, such as from an electrical signal generated within the example computing system 300 to another type of signal, and/or vice-versa. Further, the transducers 318 may be incorporated within the computing system 300, as illustrated in FIG. 13, or may be coupled thereto in a wired or wireless manner. In some embodiments, one or more environment transducer devices 318 may sense characteristics or aspects of an environment local to or remote from the example computing device 300, such as, for example, light, sound, temperature, pressure, magnetic field, electric field, chemical properties, physical movement, orientation, acceleration, gravity, and so on. Further, in some embodiments, one or more environment transducer devices 318 may generate signals to impose some effect on the environment either local to or remote from the example computing device 300, such as, for example, physical movement of some object (e.g., a mechanical actuator), heating or cooling of a substance, adding a chemical substance to a substance, and so on.

Figure 14:
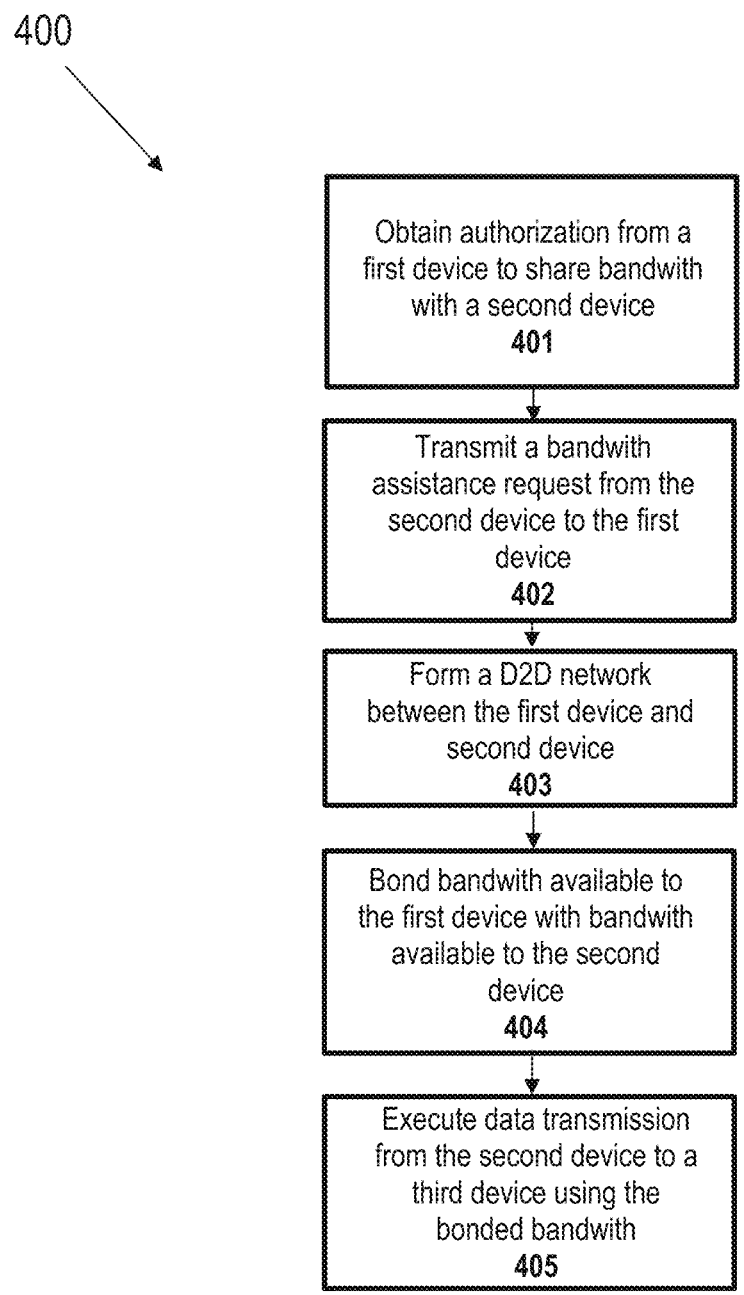
FIG. 14 is an exemplary process flow for operation of a D2D communications system utilizing a social trust model for cooperative D2D communications, according to aspects of the present disclosure.

FIG. 14 is an exemplary process flow 400 according to aspects of the present disclosure. In step 401, authorization is obtained from a first device to share bandwidth available from the first device with a second device. In this example, the first device is a relay device or helper device as described above. The first and second devices may similar to devices 2. Authorization may occur via a mobile application (app) which may host a portion of a communication system such as system 10 or system 100 in order to implement one or more aspects of the present disclosure. In other words, the first and second devices are connected via the mobile app and the mobile app provides the functionality of the communication system to the first and second devices.

In step 402, the second device transmits a request to the first device to obtain bandwidth assistance. The request may be communicated with the mobile app. The second device may have poor reception and may have insufficient bandwidth available to it to transmit and receive data and/or communicate with other devices. The request may be made automatically via the mobile app when bandwidth available to the second device meets a minimum threshold. Alternatively, an end user may initiate the request.

In step 403, a D2D network is formed between the first and second devices. D2D network may comprise an in-band licensed network such as a cellular network, or, alternatively, may comprise an out-band unlicensed network such as a Wi-Fi direct or Bluetooth.

In step 404, a portion of bandwidth available to the first device is bonded, combined, aggregated with, or coupled to the second device and the bandwidth available to the second device. The second device utilizes bandwidth available from the first device when the first device is idle or otherwise has extra bandwidth available to share with the second device.

In step 405, data transmission is executed from the second device to a third device using the bandwidth bonded between the first device and second device. The third device may comprise a content server, such as a server from YouTube, or may comprise a mobile device. Using the bandwidth aggregated from the first device and second device, the second device has maximized bandwidth available for transmission and communication with the third device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A computer program product usable with a programmable computer processor having a computer readable program code embodied in a non-transitory computer usable medium, defining machine-readable instructions for providing cooperative networking comprising:

providing a plurality of devices included within a cooperative device-to-device (D2D) communication system, a first device of the plurality of devices configured to:

serve as a relay for communication between a second device of the plurality of devices and a third device of the plurality of devices, the second device communicating using a bandwidth, wherein as the relay the first device provides additional bandwidth to the bandwidth of the second device to assist with data transmission between the second device and the third device; and forming a D2D network between the first device and the second device, wherein the second device splits its data traffic into a plurality of data streams including a first data stream between a base station and the second device that provides first bandwidth used by the second device for the data transmission with the third device, and a second data stream provided to the second device by the first device that provides a second bandwidth for the data transmission from the second device to the third device, the second device aggregating the first bandwidth and the second bandwidth to improve the data transmission with the third device.

2. The computer program product of claim 1, further comprising forming a D2D network between a fourth device of the plurality of devices and the second device.

3. The computer program product of claim 2, wherein the D2D network comprises Wi-Fi direct transmission.

4. The computer program product of claim 1, wherein the third device includes a video content server hosting a plurality of video data files.

5. The computer program product of claim 1, further comprising:
   providing a first subscriber identification module(SIM) card and a second SIM card on the second device; and
   aggregating bandwidth available to the first SIM card with bandwidth available to the second SIM card.

6. The computer program product of claim 1, further comprising:
   forming an additional D2D network between the second device and a fourth device, the fourth device configured as an additional relay device to provide additional bandwidth assistance to the second device such that both of the first device and the fourth device define relays to the second device.

* * * * *